INVENTOR.
JOHN A. SADLER
BY~ Maybee & Legris
ATTORNEYS

INVENTOR.
JOHN A. SADLER
BY Maybee & Legris
ATTORNEYS

INVENTOR.
JOHN A. SADLER
BY~ Maybee & Legris
ATTORNEYS

United States Patent Office 3,426,348
Patented Feb. 4, 1969

3,426,348
ELECTRICAL PROTECTION SYSTEM

John Alfred Sadler, Rexdale, Ontario, Canada, assignor to Chubb-Mosler and Taylor Safes Ltd., Brampton, Ontario, Canada, a corporation of Canada Filed Sept. 28, 1965, Ser. No. 490,890
U.S. Cl. 340—408 19 Claims
Int. Cl. G08b *25/00, 26/00, 27/00*

ABSTRACT OF THE DISCLOSURE

In an electrical protection system in which protected premises are connected to supervisory premises by a transmission line, triggering pulses at predetermined regular intervals are transmitted over the line to cause direct current answering pulses from the protected premises at predetermined times. An alarm signalling device at the supervisory premises includes gating means which gates the answering pulses to render an alarm normally inoperative. When the answering pulses are absent, or when simulated answering pulses occur at times other than the predetermined times, the alarm is permitted to operate.

This invention relates to an electrical protection system of the kind in which protected premises are connected to supervisory premises by a transmission line.

It is an object of the invention to provide a protection system which it is difficult to defeat.

Broadly speaking this object is accomplished by sending direct current pulses over the line to cause direct current answering pulses from the protected premises at predetermined times, with means at the supervisory premises to indicate trouble on or tampering with the line and to respond to an alarm at the protected premises. Because the line carries pulsating D.C. of precise timing it is difficult to replace the genuine answering pulses from the protected premises with false pulses.

A preferred embodiment of the invention is illustrated by way of example in the accompanying drawings in which.

Figure 1:
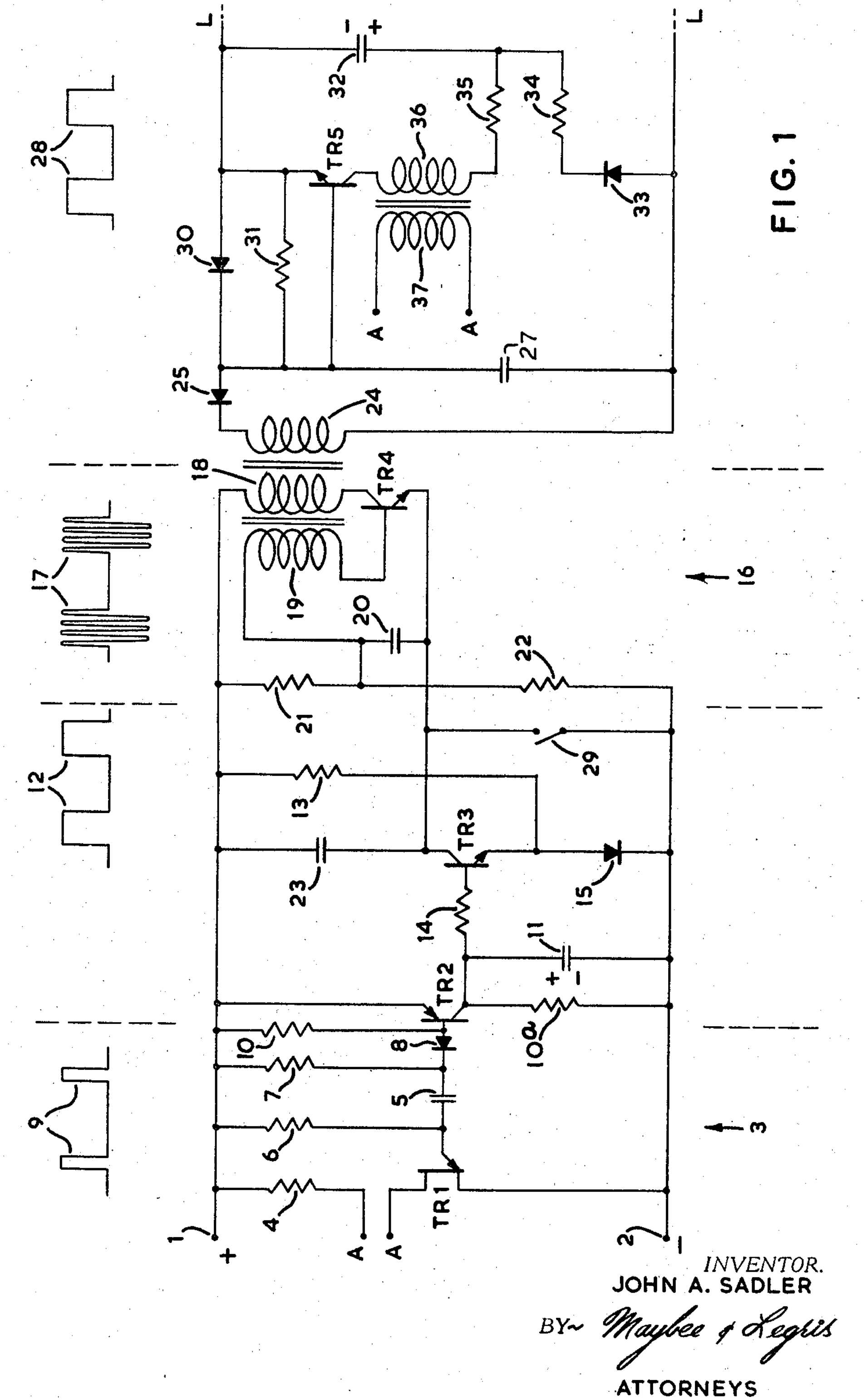
FIGURE 1 is a schematic diagram of an electrical circuit in the protected premises, with an indication of the wave patterns produced in different parts of the circuit.

The circuit at the protected premises is supplied by a six volt D.C. power supply across terminals 1, 2. A stable relaxation oscillator 3 of conventional design can be triggered by a pulse across terminals A, A which are in series with a current limiting resistor 4. The oscillator 3 consists of a unijunction transistor TR1, capacitor 5, resistors 6 and 7, and diode 8 which feeds a transistor TR2 with direct current pulses 9, the frequency of the pulses being, by way of example, one pulse per second. The transistor TR2 has a base resistor 10 collector resistor 10*a* and when turned on by the pulses 9 charges an electrolytic capacitor 11. The charge on the capacitor 11 overcomes the bias provided by resistor 13 and diode 15, turning transistor TR3 on. The capacitor 11 discharges through resistor 14 and the base of transistor TR3 and diode 15, lengthening the pulses, as indicated by pulses 12. (The pulses are of short duration, of the order of 60 milliseconds, and their length has been greatly exaggerated in the illustrations in order to facilitate the explanation.) Transistor TR3 is in series with transistor TR4 of a high frequency oscillator 16 which, for the duration of each pulse 12, oscillates at, say, fifty kilocycles per second to produce alternating current bursts 17 in the primary winding 18 of a transformer. The oscillator 16 consists of the transistor TR4, primary winding 18, feedback winding 19, high frequency bypass capacitor 20 and resistive voltage divider 21, 22. A bypass capacitor 23 keeps the oscillator frequency out of the transistor TR3. The secondary winding 24 of the transformer is in series with a detector diode 25 so that the output of the transformer is rectified, and filtered by a capacitor 27, the resultant direct current pulses 28 being sent to the right along a telephone line L, L. It will be noted that the pulses 28 are essentially replicas of the pulses 12. However, the oscillator 16 and transformer 18, 24 make it practical to isolate the telephone line from any ground in the equipment to the left of the transformer of FIGURE 1, and yet send direct current pulses along the telephone line: grounding one side of the telephone line may unbalance it. Across the transistor TR3 is a switch 29 representing any alarm device which can be closed to cause the oscillator 16 to oscillate continuously and thus replace the pulses 28 with a D.C. alarm signal on the line. Such a signal, as will be seen, will cause an alarm signal at the supervisory premises.

It has been mentioned that the oscillator 3 can be triggered by a pulse across terminals A, A. As will be explained with reference to FIGURE 2, triggering pulses of the same polarity as the pulses 28 are sent over the line L, L from the supervisory premises. A diode 30 is provided in the upper line L and permits current flow through it during pulses 28 that travel to the right but does not permit current flow through it during triggering pulses that travel in the opposite direction. The diode 30 and a resistor 31 are connected between the base and emitter of a transistor TR5. During the outgoing pulses 28 the current through diode 30 back biases the transistor TR5, but during incoming triggering pulses current flows through the base of transistor TR5 and capacitor 27. An electrolytic capacitor 32, which charges through diode 33 and resistor 34 whenever pulses are on the line L, L, can now discharge through a resistor 35 and transformer winding 36 and transistor TR5 to introduce a substantial triggering pulse in the transformer secondary winding 37 which is connected across the terminals A, A to trigger unijunction oscillator 3. The first pulse 28 from the oscillator 3 substantially coincides with the triggering pulse, the next pulse 28 following at a time interval (in the example previously given, one second) determined by the constants of the oscillator 3. It will be noted that the line L, L is isolated from the terminals A, A by the transformer 36, 37 so that the line L, L is not grounded by any ground in the circuit of oscillator 3.

Figure 2:
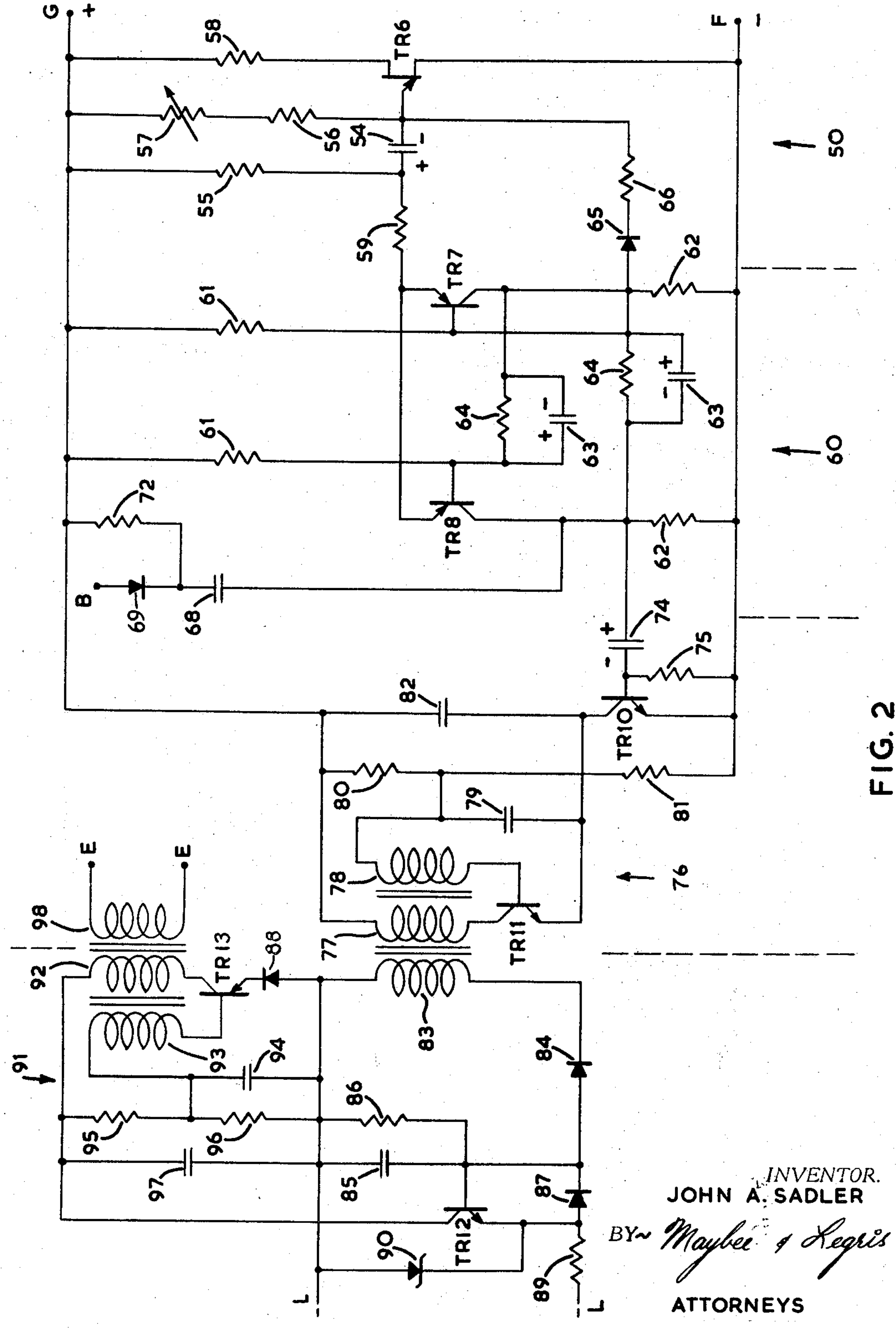
FIGURE 2 is a schematic diagram of part of the electrical circuit in the supervisory premises.

Now considering the circuit shown in FIGURE 2 for the supervisory premises, a stable relaxation oscillator 50 produces direct current pulses some of which are sent over the line L, L to trigger the oscillator 3. Like the oscillator 3 the oscillator 50 is powered from a six volt D.C. power supply across terminals F, G and consists of a unijunction transistor TR6, capacitor 54, resistors 55, 56 and a variable resistor 57 which can be adjusted to vary the time of discharge of the capacitor 54 and thus the frequency of pulses from the oscillator. A resistor 58 limits the current through TR6. Pulses from the oscillator 50 are transmitted through a resistor 59 to trigger a bistable counter 60. The counter 60 consists of two transistors TR7 and TR8 that have base resistors 61 and collector load resistors 62 and that are cross-coupled by capacitors 63 having bypass resistors 64. The transistors TR7 and TR8 are triggered alternately by the pulses from the oscillator 50. Each transistor when turned on holds the other biased off until the next triggering pulse; the pulse raises the emitter voltage of the transistors, turning off the one that has been on, whereupon the charges built up in the capacitors 63 allow the other transistor to turn on. When TR7 turns on the oscillator timing capacitor 54 has a further discharge path through diode 65 and resistor 66, and therefore TR7 remains on for a shorter time than TR8. For example, when the variable resistor 57 is set to provide a time interval of one second between pulses when TR8 is turned on, the time interval may be reduced to, say, three-quarters of a second when TR7 is on. When TR8 goes off, there is a gating pulse through a capacitor 68 and diode 69 to a point B, and as will be explained with reference to FIGURE 3 the point B is connected to the base of a gating transistor TR9. When TR8 goes on there is another pulse through the capacitor 68 but this pulse is not accepted by the diode 69 and is absorbed by a resistor 72.

When the transistor TR8 is turned on, a transistor TR10 turns on until capacitor 74 becomes charged through TR8. When the capacitor 74 is charged, TR10 turns off, and when transistor TR8 goes off the capacitor 74 discharges through resistors 62 and 75, Thus, in the example given, where the oscillator 50 sends out pulses that are alternately one second and three-quarters of a second apart, transistor TR10 is turned on at intervals one and three-quarter seconds apart, and the duration of the pulse through TR10 is determined by the size of capacitor 74. One second after TR10 goes on, TR8 goes off and a gating pulse is sent to terminal B.

Transistor TR10 is in series with transistor TR11 of a high frequency oscillator 76 which, while TR10 is turned on, oscillates at, say, fifty kilocycles per second to produce alternating current bursts in the primary winding 77 of a transformer. The oscillator 76 consists of the transistor TR11, winding 77, feedback winding 78, capacitor 79 and resistive voltage divider 80, 81. A capacitor 82 keeps the oscillator frequency out of the transistor TR10. The secondary winding 83 of the transformer is in series with a detector diode 84 so that the output of the transformer is rectified and is filtered by a capacitor 85 connected across the base resistor 86 of a transistor TR12, and a D.C. triggering pulse is sent along the telephone line L, L to the protected premises. In the example given, such triggering pulses are sent to the protected premises every one and three-quarters of a second. The oscillator 76, transformer 77, 83 and detector 84, 85 permit D.C. triggering pulses to be sent out on the line L, L without grounding the line through any ground in the equipment of FIGURES 3 and 2.

Figures 3, 4:
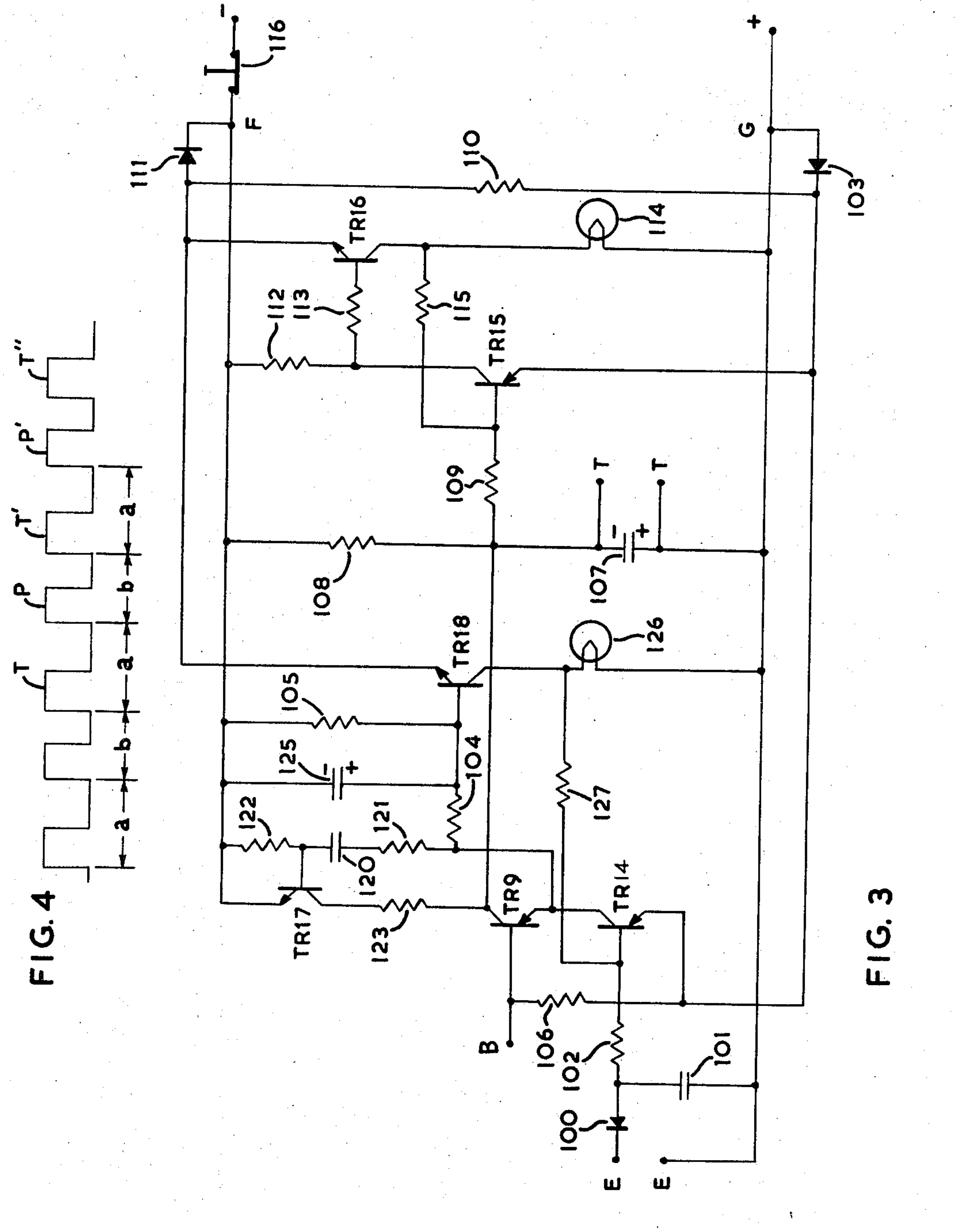
FIGURE 3 is a schematic diagram of the rest of the circuit in the supervisory premises.
FIGURE 4 is a diagram indicating the wave pattern normally transmitted between the protected and supervisory premises by a connecting telephone line.

FIGURE 4 is a simplified illustration of the pulses transmitted by the line L, L as a result of the triggering pulses emanating from the circuit of FIGURE 2 and the pulses sent from the circuit of FIGURE 1. In FIGURE 4, pulses T, T′, T″, etc., are triggering pulses that emanate from the oscillator 50 via transistors TR8, TR10 and TR11. The triggering pulse T, for example, turns on transistor TR5 at the protected premises, appears across terminals A, A, and triggers oscillator 3 which sends a first pulse 28 that is coincident with the first part of the triggering pulse, the triggering pulses being of longer duration than the pulses 28. After an interval *a* of one second the oscillator 3 sends out another answering pulse 28 that constitutes pulse P of FIGURE 4. One and three-quarter seconds later (the interval *a* plus *b*) another triggering pulse T′ is sent from the supervisory premises causing the answering pulse P′, and the sequence repeats indefinitely as long as the system remains undisturbed.

How the condition of the system is detected will now be explained.

During the time when a triggering pulse T is being sent from the supervisory premises, the bias across diode 87 of FIGURE 2 holds transistor TR12 off. However during the time when a pulse P is travelling on the line L, L from the protected premises, and no triggering pulse T is being sent out, the bias across diode 87 is in a direction to turn TR12 on and thus to turn on a transistor TR13 in series therewith, the pulse being in the correct polarity to pass through a diode 88 also in series with these transistors. The transistors are protected by a current limiting resistor 89 in series with the line, and by a Zener diode 90. The transistor TR13 forms part of a high frequency oscillator 91 which operates during the pulse, the oscillator including transformer primary winding 92, feedback winding 93, capacitor 94 and resistive voltage divider 95, 96, with a capacitor 97 that keeps the oscillator frequency off the line L, L.

The oscillator 91 supplies high frequency bursts to a secondary winding 98 which is connected by terminals E, E to the circuit of FIGURE 3. The bursts are rectified by detector diode 100 of FIGURE 3 and smoothed by capacitor 101 to apply D.C. pulses via resistor 102 to the base of a transistor TR14. Thus the oscillator 91, transformer 92, 98 and detector 101, 102 permit D.C. pulses on the telephone line to be transmitted to equipment shown in FIGURE 3 which can be grounded without unbalancing the telephone line. Transistor TR14 is supplied from the terminals F, G (also shown in FIGURE 2), the emitter of transistor TR14 being connected to terminal G through diode 103 and the collector to terminal F through resistors 104, 105. Thus transistor TR14 turns on in response to each answering pulse P, P′, etc., from the protected premises. A transistor TR9 has its base connected to terminal B, and referring to FIGURE 2 it will be remembered that terminal B receives gating pulses from the counter 60 one second after each triggering pulse that is sent over the line L, L. These gating pulses are applied across resistor 106 of FIGURE 3 to transistor TR9, and thus TR9 and TR14 are normally turned on concurrently by the coincident answering and gating pulses. TR9 and TR14 are, through diode 103, connected in series across a capacitor 107 and each time these gating transistors turn on they discharge the capacitor 107. When the gating transistors are off the supply F, G increases the charge on capacitor 107 through resistor 108. If there should be trouble on the line L, L (for example, if the line should be cut) so that TR14 fails several times to turn on, the charging of capacitor 107 will continue until the voltage across it, applied to the base of transistor TR15 by resistor 109, reaches a level sufficient to overcome the bias developed across diode 103 by current flowing through diode 103, resistor 110 and diode 111. Transistor TR15 turns on, and the voltage which results across collector resistor 112 is applied via resistor 113 to turn on transistor TR16 and thereby illuminate a blue light 114 to indicate line trouble. TR15 and TR16 are thereafter held on, irrespective of discharge of capacitor 107, by negative base voltage applied through feedback resistor 115. Thus the blue light 114 remains on until the line trouble is cured and the reset button 116 is pushed down. The blue light 114 also goes on if someone tries to tamper with the system by imposing on the line L, L (in lieu of the pulses of FIG. 4) pulses that do not coincide with the gating pulses received at B.

The capacitor 107 and resistors 108 and 109 form an analogue memory circuit whose time constant is such that the capacitor will not become charged to the critical level in a time less than the interval between two triggering pulses. Thus more than one answering pulse must be absent for the blue light 114 to be illuminated, and so the system will not respond to momentary disturbances on the line.

In an effort to defeat the system a burglar might impose on the line L, L pulses of sufficiently high frequency that they arrive at the supervisory premises at the same time as the pulses P, P′, etc., of FIGURE 4 but at intervening times as well. To deal with this possibility, each time the transistor TR14 turns on a transistor TR17 also goes on momentarily, until capacitor 120 becomes charged through resistors 121, 122. For the short time that transistor TR17 is on, the capacitor 107 charges more rapidly through resistor 123, and a few such short injections of charge will be sufficient to cause the blue light 114 to be turned on.

If a burglar should measure the pulses on the line L, L and attempt to defeat the system by imposing identical pulses thereon it would be very difficult for him to duplicate the polarity and time intervals between signalling pulses P, P′ and to synchronise his pulses P, P′ with the gating pulses at terminal B. Because the intervals *a* plus *b* between triggering pulses are not multiples of the intervals *a* between triggering and answering pulses the line presents a confusing pattern of pulses to someone who attempts to measure what is on it. Any attempt to substitute for the unit of FIGURE 1 a similar unit stolen from other protected premises can be frustrated by setting the oscillators of different units to send pulses at different time intervals.

Now suppose that, with the blue light 114 off and the system operating normally, the switch 29 of FIGURE 1 is closed, for example by a teller in a bank. As explained with reference to FIGURE 1 this will cause the pulses of FIGURE 4 to be replaced with a steady D.C. signal, and transistor TR14 will therefore stay on (except while triggering pulses are on the line) while transistor TR9 turns on and off, periodically discharging capacitor 107 so that the blue light 114 is not turned on. Because TR14 stays on, a capacitor 125 can build up a sufficient charge to turn on transistor TR18 and thus a red light 126 which indicates an alarm condition. The light 126 can be turned on even if the light 114 has previously been turned on. A feedback resistor 127 holds transistor TR14 on whereby the red light is held on until the reset button 116 is pushed down.

Test points T, T are provided across the capacitor 107 to facilitate adjusting the frequency of the oscillator 50 of FIGURE 2 to that of the oscillator 3 of FIGURE 1. A voltmeter is connected across the points T, T and resistor 57 of oscillator 50 is adjusted until a minimum reading is obtained on the voltmeter.

Pushing the reset button 116 disconnects the power supply for both the blue and red lights 114 and 126. If there is no trouble in the system, release of the reset button will (on the first try, usually) allow the oscillators 50 and 3 to synchronize before the lights go on, thus keeping the lights off until an alarm or line trouble conditions occurs.

Suitable components for the circuits are as follows:

FIGURE 1

| Resistor: | | |
|---|---|---|
| **4** | ohms | 220 |
| **6** | do | 10–47 |
| **7** | do | 100 |
| **10** and **22** | | 4.7K |
| **10*a*** | | 3.9K |
| **13** and **21** | | 10K |
| **14** | ohms | 470 |
| **31** | | 1K |
| **34** and **35** | ohms | 47 |

| Capacitor: | Microfarads |
|---|---|
| **5** | 5–25 |
| **11** | 10 |
| **20** | 0.02 |
| **23** | 0.1 |
| **27** | 1 |
| **32** | 10 |

FIGURE 2

| Resistor: | | |
|---|---|---|
| **55** | ohms | 22 |
| **56** | | 15K |
| **57** | | 60K |
| **58** and **59** | ohms | 220 |
| **61** and **62** | | 2.2K |
| **64**, **75**, **81** and **96** | | 4.7K |
| **66** | | 33K |
| **72**, **80** and **95** | | 10K |
| **86** | | 47K |
| **89** | ohms | 470 |

| Capacitor: | Microfarads |
|---|---|
| **54** | 25 |
| **63** | 10 |
| **68** | 50 |
| **74** | 10 |
| **79** | 0.02 |
| **82** | 0.1 |
| **85** | 0.1 |
| **94** | 10 |
| **97** | 0.1 |

Zener diode 90 — 1N1776

FIGURE 3

| Resistor: | | |
|---|---|---|
| **102** | ohms | 390 |
| **104**, **105** and **112** | | 2.2K |
| **106**, **115**, **122** and **127** | | 4.7K |
| **108** and **121** | | 22K |
| **109** and **110** | | 10K |
| **113** | ohms | 390 |
| **123** | | 1K |

| Capacitor: | Microfarads |
|---|---|
| **101** | 0.5 |
| **107** | 320 |
| **120** | 10 |
| **125** | 320 |

| Lamp: | Milliamperes |
|---|---|
| **114** | 150 |
| **126** | 150 |

Each of the diodes may be a 1N3544, each NPN transistor a 2N1304 and each PNP transistor a 2N1305.

What I claim as my invention is:

1. An electrical protection system for protected premises connected to supervisory premises by a transmission line, the system comprising first means for installation at the supervisory premises for sending direct current triggering pulses over the line at predetermined regular intervals, second means for installation at the protected premises for sending direct current answering pulses over the line at constant predetermined intervals after the triggering pulses, the second mentioned intervals being different from the first mentioned intervals, the first means including signalling means and control means responsive to a variation from said answering pulses to operate the signalling means.

2. An electrical protection system as claimed in claim 1, wherein the first means include means responsive to a triggering pulse to prevent reception of pulses from the line during the triggering pulse.

3. An electrical protection system as claimed in claim 2, wherein the second means include triggering means responsive to an incoming triggering pulse but non-responsive to an outgoing answering pulse.

4. An electrical protection system as claimed in claim 1, wherein the control means is responsive to failure to receive the answering pulses.

5. An electrical protection system as claimed in claim 1, wherein the control means is responsive to voltages on the line other than the answering pulses.

6. An electrical protection system as claimed in claim 1, wherein the first mentioned intervals are longer than but not multiples of the second mentioned intervals.

7. An electrical protection system as claimed in claim 6, wherein the second means send a single answering pulse between successive triggering pulses.

8. An electrical protection system as claimed in claim 1, wherein the first means comprise an oscillator for producing bursts of alternating current, and a transformer and a detector for coupling the oscillator output to the transmission line to produce the direct current triggering pulses on the line while allowing the line to remain ungrounded.

9. An electrical protection system as claimed in claim 8, wherein the second means comprise a second oscillator for producing bursts of alternating current, and a transformer and a detector for coupling the second oscillator to the transmission line to produce the direct current answering pulses on the line while allowing the line to remain ungrounded.

10. An electrical protection system as claimed in claim 9, including means for operating the oscillator continuously to produce a direct current alarm signal on the line.

11. An electrical protection system as claimed in claim 9 wherein a transformer couples the transmission line to the second means for introducing the triggering pulses to the second means while allowing the line to remain ungrounded.

12. An electrical protection system as claimed in claim 11, including an oscillator connectable to the line and responsive to the direct current answering pulses to produce bursts of alternating current, and a transformer and a detector for coupling the last mentioned oscillator to the control means without grounding the line.

13. An electrical protection system as claimed in claim 12, wherein the pulses of direct current and bursts of alternating current are produced by solid state devices.

14. An electrical protection system for protected premises connected to supervisory premises by a transmission line, the system comprising first means for installation at the supervisory premises for sending direct current triggering pulses over the line at predetermined regular intervals, second means for installation at the protected premises and triggered by the triggering pulses to send direct current answering pulses over the line between the triggering pulses at constant predetermined intervals after the triggering pulses, the first means including means for producing gating pulses substantially coincident in time with the answering pulses and means for producing gating pulses substantially coincident in time with the triggering pulses, signalling means, and control means responsive to the gating and answering pulses to render the signalling means normally inoperative.

15. An electrical protection system as claimed in claim 14, wherein the control means include means for rendering the signalling means operative when voltages appear on the line other than the triggering and answering pulses.

16. An electrical protection system as claimed in claim 14, wherein the control means include means for rendering the signalling means operative in the absence of answering signals.

17. An electrical protection system as claimed in claim 16, wherein the control means comprise a capacitor for rendering the signalling means operative when the capacitor has a predetermined charge, means for enabling the capacitor to reach said predetermined charge, and means responsive to the answering pulses for preventing the capacitor from reaching said predetermined charge.

18. An electrical protection system as claimed in claim 17, wherein the control means include means responsive to voltages on the line in addition to the triggering and answering pulses for causing the capacitor to reach said predetermined charge.

19. An electrical protection system as claimed in claim 17, wherein the capacitor forms part of an analogue memory circuit having a time constant such that the capacitor will not reach the predetermined charge in a time less than the interval between two triggering pulses.

References Cited

UNITED STATES PATENTS

| | | | |
|---|---|---|---|
| 3,171,108 | 2/1965 | MacKeen | 340—152 X |
| 3,307,176 | 2/1967 | Sadler | 340—276 X |

JOHN W. CALDWELL, *Primary Examiner.*

D. L. TRAFTON, *Assistant Examiner.*

U.S. Cl. X.R.

340—416; 179—2